United States Patent [19]
Kirsch

[11] 4,027,620
[45] June 7, 1977

[54] INSTRUMENT PANEL

[76] Inventor: Lawrence J. Kirsch, 1847 Preuss Road, Los Angeles, Calif. 90035

[22] Filed: Jan. 5, 1976

[21] Appl. No.: 646,474

[52] U.S. Cl. ........................ 116/129 T; 116/129 H; 340/366 F

[51] Int. Cl.² .......................................... G09F 9/00

[58] Field of Search ....... 116/129 T, 129 H, 127 R, 116/129 E; 340/366 F, 248 B, 248 C; 324/114

[56] References Cited

UNITED STATES PATENTS

| | | | |
|---|---|---|---|
| 1,272,396 | 7/1918 | Dixon | 116/129 E |
| 1,296,613 | 3/1919 | Bell | 340/248 C |
| 1,417,049 | 5/1922 | Farmer | 116/129 T |

*Primary Examiner*—S. Clement Swisher
*Assistant Examiner*—Denis E. Corr
*Attorney, Agent, or Firm*—George J. Netter

[57] ABSTRACT

An instrument panel is provided having a plurality of band indicators, one for each parameter being measured, arranged consecutively adjacent one another in a common direction on the panel, all displaying an output indication by movements of their respective bands in the same direction transversely of the alignment direction. The bands of each instrument also move adjacent a color coded marker, indicating a safe operating region for the parameter being measured, a "caution" region, and one where the measured parameter is beyond acceptable values. The instruments are calibrated and initially located to give readings about a single threshold line or band such that when the eyes are directed toward this mean, not only can the individual readings of each of the instruments be quickly determined, but also a relative or comparative reading of all the instruments may be readily made. Adjustment means are provided for shifting the range of movement of the bands of each of the instruments with respect to the color coded range indicators and the threshold line or band.

4 Claims, 7 Drawing Figures

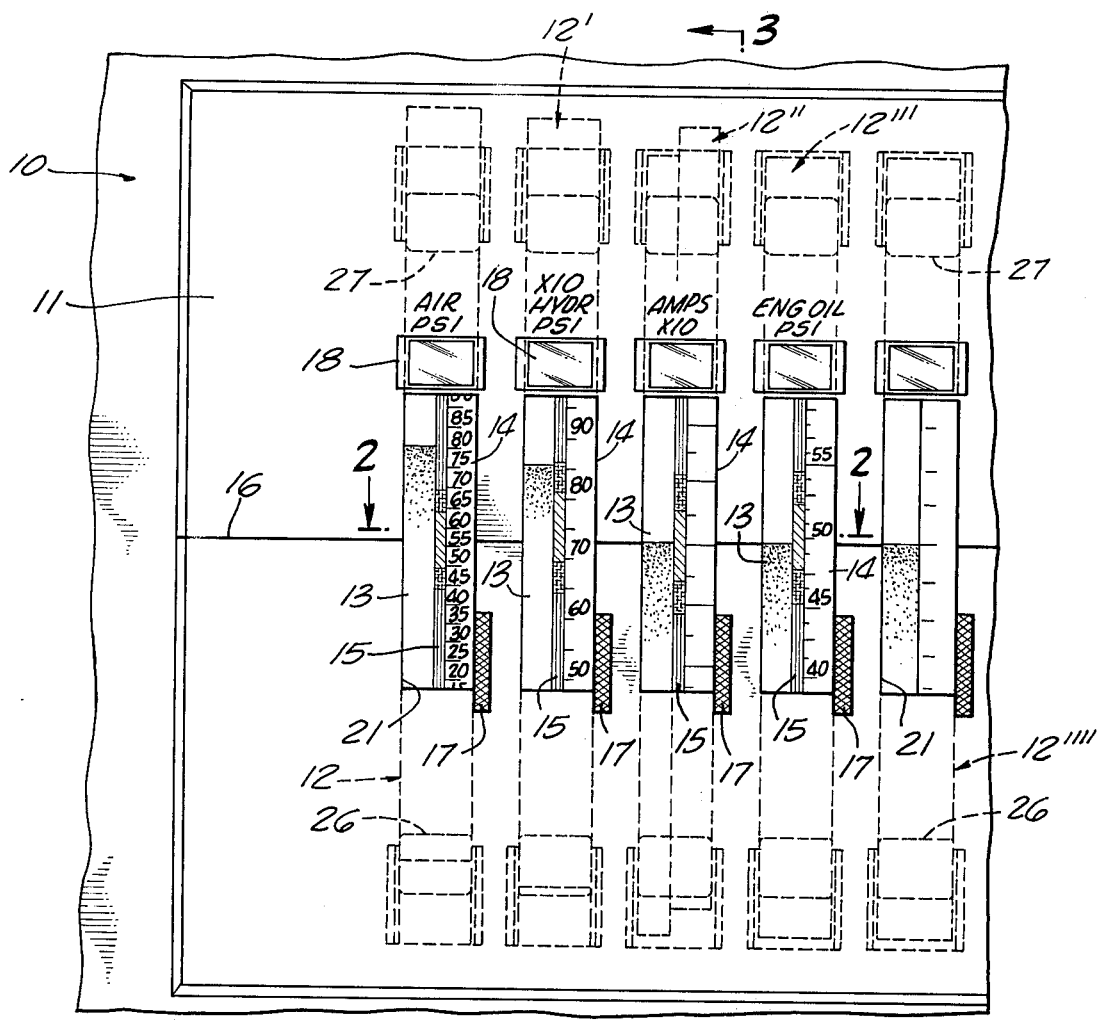

INSTRUMENT PANEL

The subject invention relates generally to an instrument panel, and, more particularly, to an improved arrangement of instruments on a common viewing surface or panel, such that the readings of the instruments may be viewed as a unit and their individual readings quickly and easily correlated.

FIELD OF THE INVENTION

There are many situations in which a plurality of instruments measuring respectively different parameters must be analyzed by an operator or user in order to take action or to make conclusions depending on the relative readings of the instruments. For example, on an aircraft instrument panel, there are a number of meters and instruments providing instantaneous display of such things as engine temperature, oil temperature, pressures and other operating aspects of the aircraft and engine, the individual readings of which must be compared with each other for full comprehension. The pilot at all times must be aware of what the different instruments are displaying and interpret not only their individual meanings, but also their relative meanings in order to select the best and safest course of action. In the past, aircraft instrument panels, particularly in the small or non-commercial aircraft, have not been arranged in a manner permitting ready comparison of the different instruments. In addition, the problem of interpretation of comparative readings has frequently been compounded by the fact that the instruments were not calibrated or commonly oriented in so convenient a manner that they could be readily compared, which, in an emergency, could be dangerous.

A major problem with known aircraft instrument arrangements is that there are always some of the instruments which are located outside the normal viewing area of the pilot. In fact, some gages are positioned so as to require the pilot to physically move his body in order to read them (e.g., behind control levers, on the floor, under the dash board), in which case they may be totally neglected, expecially by an inexperienced or low-time pilot. Because of varied locations of the different gages and instruments, even an experienced pilot must take an appreciable amount of time to initially become aware of a specific malfunction as registered on a meter, gage or instrument.

OBJECTS AND SUMMARY OF THE INVENTION

It is, therefore, a primary aim and object of this invention to provide an improved arrangement and means for displaying a plurality of instruments on a common surface permitting ready viewing individually or instrument by instrument.

Another object is the provision of an arrangement of instruments in which individual caution or warning means are located immediately adjacent each instrument and are actuatable when the instrument registers without the acceptable range.

Yet another object of the invention is the provision of an instrument panel having a plurality of substantially identical instruments with movable bandlike output indicators arranged with a common reading direction and referenced to a common threshold range.

A further object of the invention is the provision of a plurality of instruments arranged consecutively adjacent each other on a panel with the display ranges of acceptability and non-acceptability for each of the instruments aligned in horizontal strips such that individual and comparative evaluation is achievable with a minimum risk of error.

In the practice of the present invention, an instrument panel (e.g., an aircraft instrument panel) is provided having a plurality of band indicators, one for each parameter being measured, arranged consecutively adjacent one another in a common direction on the panel (e.g., horizontal line) and all displaying an output indication by movements of their respective bands in the same direction transversely of the alignment direction. The bands of each instrument also move adjacent a color coded marker, indicating a safe operating region for the parameter being measured, a "caution" region, and one where the measured parameter is beyond acceptable values. The instruments are all calibrated and are initially located to give readings about a single threshold line or band such that when the eyes are directed toward this mean, not only can the individual readings of each of the instruments be quickly determined, but also a relative or comparative reading of all the instruments may be readily made. Adjustment means are provided for shifting the range of movement of the bands of each of the instruments with respect to the color coded range indicators and the threshold line or band.

DESCRIPTION OF THE DRAWINGS

FIG. 1 is a front elevational, partially fragmentary, view of an instrument panel constructed in accordance with this invention.

FIG. 2 is a sectional, vertical plan view taken along the line 2—2 of FIG. 1.

FIG. 5 is a slightly enlarged view of one of the instruments shown in section as in FIG. 2.

DESCRIPTION OF A PREFERRED EMBODIMENT

Figure 3:
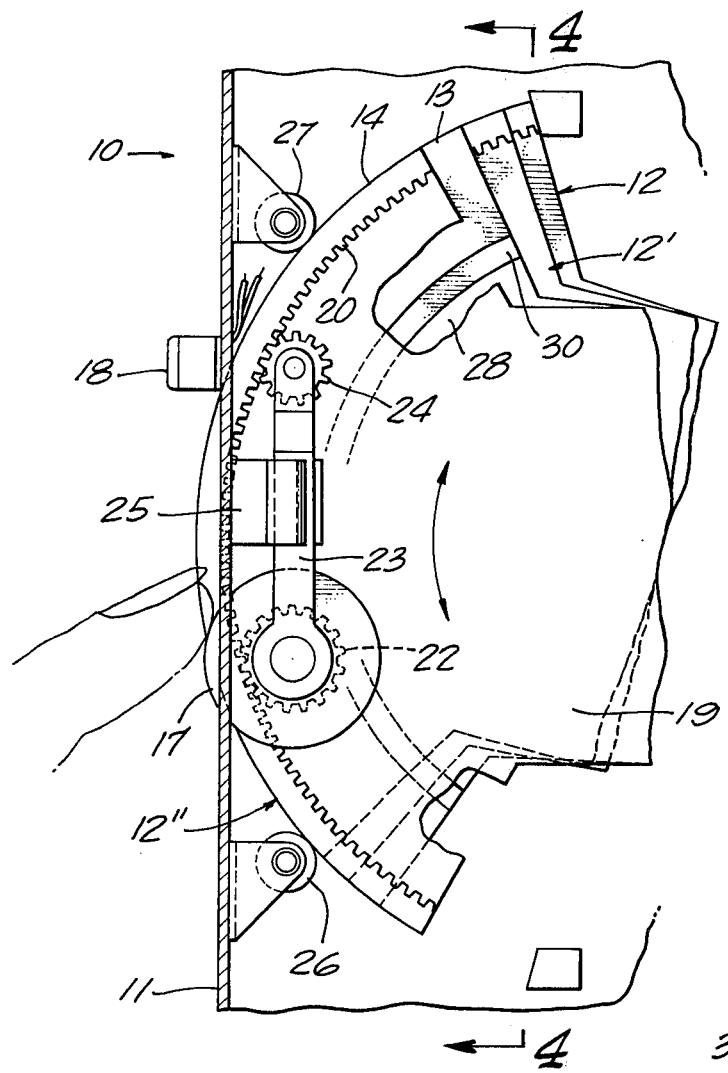
FIG. 3 is a sectional, side elevational, partially fragmentary view taken along the line 3—3 of FIG. 1.
Figure 7:
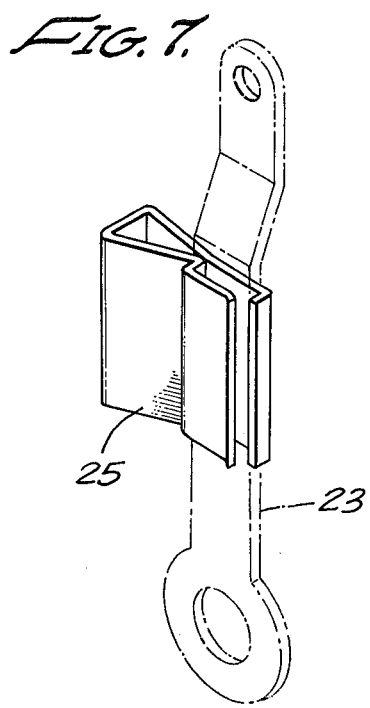
FIG. 7 is a partially schematic view of a retainer means for use with an instrument of this invention.
Figure 6:
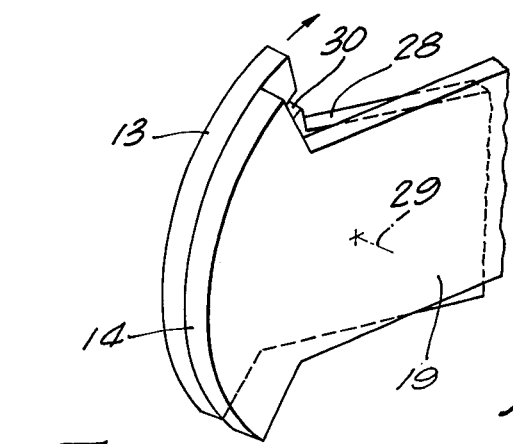
FIG. 6 is a perspective, partially fragmentary view of instrument display parts.
Figure 4:
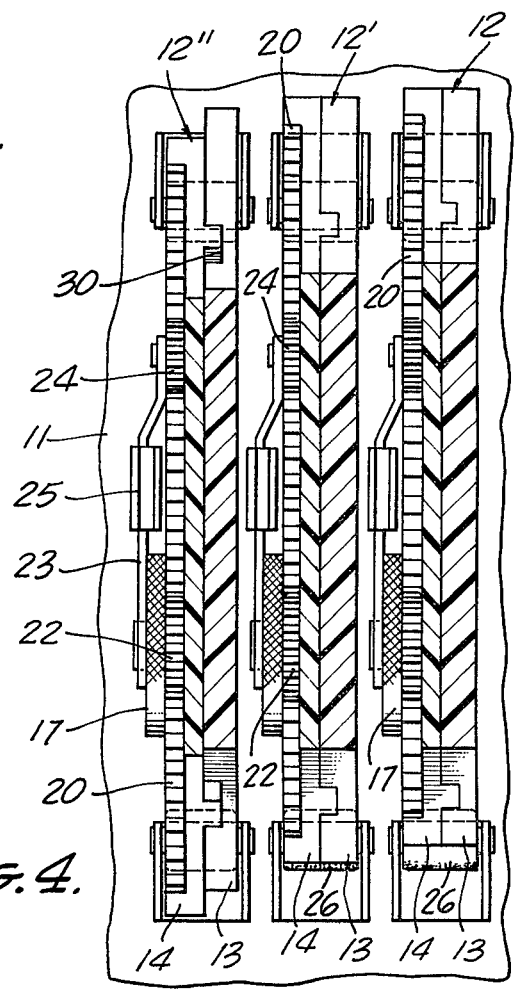
FIG. 4 is a sectional, elevational view taken along the line 4—4 of FIG. 3.

Turning now to the drawings and particularly FIG. 1, the instrument panel of the invention is shown generally as at 10 and is seen to include a mounting surface 11 and a plurality of band indicator instruments or gages 12, 12' . . . which are constructed and arranged on the surface 11 in a way that will be more particularly described herein. Although the invention may be found advantageous in other contexts, it is believed to have special merit when used as an aircraft instrument panel and will be described here in that connection. Accordingly, the band instruments 12, 12' . . . shown in FIG. 1 are further identified as AIR PSI (air pressure in pounds per square inch), × 10 HYDRO PSI (hydraulic pressure), AMPS × 10 (generator or alternator current in amperes) and ENG OIL PSI (engine oil pressure) which are representative of but some of the instruments and gages typically used in aircraft.

Each of the instruments 12, 12' . . . shown in FIG. 1 are further identified as AIR PSI (air pressure in pounds per square inch), × 10 HYDRO PSI (hydraulic pressure), AMPS × 10 (generator or alternator current in amperes) and ENG OIL PSI (engine oil pressure)

which are representative of but some of the instruments and gages typically used in aircraft.

Each of the instruments 12, 12'... includes a bandlike indicator 13 which is movable relative to a numerically scaled reference 14 responsive to changes in the particular parameter or physical condition being measured. Portions of the reference 14 are color coded as at 15 to define a fully acceptable range, one (or more) questionable ranges, and unacceptable ranges. For example, the acceptable range could be colored green, the questionable range/s yellow, and the unacceptable range, red.

The panel mounting surface 11 includes a straight line 16 along which the instruments 12, 12'... are sequentially and substantially uniformly spaced. More particularly, the instruments are arranged such that their respective display portions extend orthogonally to the line 16 with the acceptability range of each being generally centered on the line. A thumbwheel adjustment knob 17 is provided with each instrument for shifting the band indicator 13 and associated enumerated strip 14 as a unit with respect to the threshold 16.

In addition, each instrument 12, 12'... has a warning light 18 mounted on the surface 11 at the instrument upper end as the instruments are mounted in FIG. 1, which light is actuated on the associated instrument band indicator 13 registering in the unacceptable range or optionally also in the caution range/s.

Turning now to FIG. 3, the enumerated band 14 of the instrument 12 is seen to further include a platelike body 19, the outer periphery of which carries the band formed into a generally circular arrangement. The inner surface of the band 14 has a circumferentially extending set of gear teeth 20. A rectangular opening 21 in the mounting surface 11 (cf. FIG. 1) allows a portion of the band 14 to extend therethrough for viewing. The thumbwheel 17 has a gear wheel 22 axially affixed thereto, which in turn is rotatably mounted at one end of a support arm 23, with the other end of arm 23 including a rotatable follower gear 24. The arm 23 is secured at its central portions by a clip 25 mounted to the inner surface of 11, to maintain the teeth of the gear wheels 22 and 24 in engagement with the teeth 20. A pair of rollers 26 and 27 affixed to the inner surface of 11 engage the outwardly directed parts of band 14 and in cooperation with gears 22 and 24 maintain the band (and other associated parts to be described) slightly spaced from the panel mounting surface 11 and with portions thereof extending through the opening 21. As can be most easily seen in FIG. 3, manipulation of thumbwheel 17 drives the band 14 to selectively locate different parts of the band within the viewing opening 21.

With simultaneous reference now to FIGS. 2–6, it is to be seen that the band indicator 13 has an interconnected body plate 28, the overall geometry and dimensions of which are substantially identical to the enumerated band 14 and plate 19. In assembled condition, the plate 28 abuts against the plate 19 and is interconnected therewith by a pin represented schematically as at 29, located at the centers of both 13 and 14, whereby the bands register and the enumerated band can be rotated relative to each other and remain coextensive. A key 30 on plate 28, spaced inwardly of band 13 and parallel therewith, is guidedly received within an oversize groove in plate 19.

The plate 28 is driven in a way well known in the instrument art to effect reading of some engine or flight characteristic, for example, thus, if the pressure of hydraulic fluid is being measured, the driving means can be a so-called Bourdon tube (not shown). Where the parameter or characteristic being measured is electrical or convertable to an electric signal, a galvanometer type apparatus may be employed to drive the band 13.

In full assembly and operation, the instrument panel 10 has each of the individual instruments all located so that all readings are made in the same direction, namely, transversely of the same base or threshold line 16, with the color-coded acceptable ranges centered on the same line. The operator may quickly and with small chance of error, read all the meters by running his eye along the line 16. For example, on looking along the line 16, the location of the registering end of band 13 within the acceptable, caution or unacceptable ranges can be readily determined.

At times it may be important or desirable to monitor a given instrument more closely, and this may be done by adjusting the band indicator 13 of the instrument until it coincides with the line 16 so that even a slight change in reading is immediately detectable by virtue of its having moved out of coincidence with the base line.

With the warning light located immediately adjacent its associated gage or instrument, when it is lighted not only is the particular physical characteristics or function concerned clearly identified, but also on malfunction of the warning light, direct reading of the associated instrument or gage establishes the true condition. This is in sharp contrast to the present practice in aircraft which is to provide a single warning light for a number of instruments such that when it comes on the pilot must then search for the particular gage or instrument which will show him what the problem is. Also, and still referring to present systems, with one warning light for a number of gages, there are types of malfunctions where the light will flicker a few times and then stay off, so that the pilot then has to make a complete search of the gages to find out whether it is a gage or the warning light system which is malfunctioning.

Still further, there are many times when it is advisable that the readings of several instruments be comparatively examined. If this is a frequent matter, the instruments may be located immediately adjacent one another. Also, such comparative viewing can be considerably facilitated by initially locating the reading ends of the band indicators of the instruments so as to coincide with the base or threshold line.

I claim:
1. An instrument panel, comprising:
a panel having a threshold line on a surface thereof; and
a plurality of instruments mounted to said panel in spaced arrangement along said threshold line, each of said instruments including a movable bandlike registering means, an enumerated band adjacent said registering means, a coded means indicating the acceptable reading range of said registering means, and a finger operated wheel for shifting the registering means, enumerated band and coded means as a unit relative to said threshold line;
each of said instruments being commonly oriented with respect to the threshold line so that movements of the bandlike registering means are all transverse to the threshold line.

2. An instrument panel as in claim 1, in which there is further provided an individual warning light mounted on the panel immediately adjacent each instrument which is actuated when the bandlike registering means of the associated instrument is without the coded acceptable reading range.

3. An instrument panel as in claim 1, in which the threshold line is a straight line extending generally horizontally as normally viewed, the registering bands moving substantially orthogonally to the threshold line, and the coded acceptable range being substantially centered on said line.

4. An instrument panel, comprising:

a panel having a threshold indication on a surface thereof; and a plurality of instruments mounted on said panel in mutually spaced arrangement with respect to said threshold indication, each of said instruments including a movable registering means, a coded means indicating the acceptable range of said registering means, and a finger operated wheel for shifting the registering means and coded means as a unit relative to said threshold indication;

each of said instruments being commonly oriented with respect to the threshold indication so that movements of the registering means are all transverse to the threshold line.

* * * * *